US012003512B2

(12) United States Patent
Anani et al.

(10) Patent No.: US 12,003,512 B2
(45) Date of Patent: Jun. 4, 2024

(54) LIMITING DISCOVERY OF A PROTECTED RESOURCE IN A ZERO TRUST ACCESS MODEL

(71) Applicant: Cisco Technology, Inc., San Jose, CA (US)

(72) Inventors: Sharif Mufid-Sharif Anani, Ann Arbor, MI (US); Omar Abduljaber, Ypsilanti, MI (US); Christopher Carl Cassell, Ann Arbor, MI (US); Marc Neuberger, Ann Arbor, MI (US); David Steven Gross, Cincinnati, OH (US); Luis Daniel Mendez, Ypsilanti, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 276 days.

(21) Appl. No.: 17/506,956

(22) Filed: Oct. 21, 2021

(65) Prior Publication Data

US 2023/0126355 A1 Apr. 27, 2023

(51) Int. Cl.
*H04L 29/00* (2006.01)
*H04L 9/40* (2022.01)

(52) U.S. Cl.
CPC ........ *H04L 63/108* (2013.01); *H04L 63/0807* (2013.01); *H04L 63/083* (2013.01); *H04L 2463/082* (2013.01)

(58) Field of Classification Search
CPC . H04L 63/108; H04L 63/0807; H04L 63/083; H04L 2463/082; H04L 63/0281; H04L 63/10

See application file for complete search history.

(56) References Cited

U.S. PATENT DOCUMENTS 9,137,228 B1 * 9/2015 Newstadt ................ H04L 63/08
9,491,155 B1 * 11/2016 Johansson ............. G06F 21/604
9,571,481 B1 * 2/2017 Baer ........................ G06F 21/42
(Continued)

FOREIGN PATENT DOCUMENTS

WO      2021114925 A1      6/2021

OTHER PUBLICATIONS

PCT Search Report corresponding to PCT/US2022/078006, dated Jan. 17, 2023, 15 pages.

(Continued)

*Primary Examiner* — Don G Zhao
(74) *Attorney, Agent, or Firm* — Baker Botts L.L.P.

(57) ABSTRACT

According to an embodiment, a system comprises one or more processors and one or more computer-readable non-transitory storage media comprising instructions that, when executed by the one or more processors, cause one or more components of the system to perform operations. The operations comprise determining that an endpoint device has requested to discover a location of a protected resource that is protected by a gateway, determining whether the endpoint device has provided a token that is valid, and permitting the endpoint device to discover the location of the protected resource based on determining that the endpoint device has provided the token that is valid. The token indicates that the endpoint device successfully completed a first multi-factor authentication procedure in connection with accessing an authentication enforcement resource.

20 Claims, 5 Drawing Sheets

(56) References Cited

U.S. PATENT DOCUMENTS

| | | | |
|---|---|---|---|
| 9,690,925 B1* | 6/2017 | Banerjee | G06F 21/44 |
| 9,794,227 B2* | 10/2017 | Laivand | H04L 63/0281 |
| 9,923,927 B1* | 3/2018 | McClintock | H04L 63/0846 |
| 10,419,448 B2* | 9/2019 | Parthasarathy | H04L 63/0838 |
| 10,547,599 B1* | 1/2020 | Mehta | H04L 63/08 |
| 10,592,978 B1* | 3/2020 | Vaystikh | G06F 21/31 |
| 10,719,618 B2* | 7/2020 | Kakumani | H04L 63/08 |
| 10,958,662 B1 | 3/2021 | Sole et al. | |
| 11,252,146 B2* | 2/2022 | Barhudarian | H04L 63/0846 |
| 11,329,989 B2* | 5/2022 | Threlkeld | H04L 63/101 |
| 2012/0084804 A1* | 4/2012 | Simmons | H04N 21/235 725/28 |
| 2013/0036476 A1* | 2/2013 | Roever | G06F 21/10 726/27 |
| 2014/0040993 A1* | 2/2014 | Lorenzo | H04L 63/10 726/4 |
| 2015/0150109 A1* | 5/2015 | Bocanegra | H04L 63/0807 726/9 |
| 2015/0256514 A1* | 9/2015 | Laivand | H04L 63/105 726/3 |
| 2016/0092176 A1* | 3/2016 | Straub | G06F 8/34 717/107 |
| 2016/0092179 A1* | 3/2016 | Straub | G06F 8/71 717/107 |
| 2016/0092180 A1* | 3/2016 | Straub | G06T 11/60 715/762 |
| 2016/0092339 A1* | 3/2016 | Straub | G06F 9/44521 717/124 |
| 2016/0092348 A1* | 3/2016 | Straub | G06F 8/61 717/124 |
| 2016/0094531 A1* | 3/2016 | Unnikrishnan | H04L 63/08 726/7 |
| 2016/0277383 A1* | 9/2016 | Guyomarc'h | H04L 63/0853 |
| 2016/0277388 A1* | 9/2016 | Lowe | G06F 21/35 |
| 2017/0046134 A1* | 2/2017 | Straub | G06F 21/64 |
| 2017/0046235 A1* | 2/2017 | Straub | G06F 16/2379 |
| 2017/0048215 A1* | 2/2017 | Straub | H04L 63/0823 |
| 2017/0048252 A1* | 2/2017 | Straub | H04L 67/02 |
| 2017/0048319 A1* | 2/2017 | Straub | G06F 16/9574 |
| 2017/0048339 A1* | 2/2017 | Straub | G06F 16/2379 |
| 2017/0099148 A1 | 4/2017 | Ochmanski et al. | |
| 2018/0007059 A1* | 1/2018 | Innes | G06F 21/6218 |
| 2018/0115554 A1* | 4/2018 | Dyon | H04L 63/164 |
| 2018/0234464 A1* | 8/2018 | Sim | H04L 9/3213 |
| 2018/0316676 A1 | 11/2018 | Gilpin et al. | |
| 2019/0068570 A1 | 2/2019 | Ghafourifar et al. | |
| 2019/0245917 A1* | 8/2019 | Mendiola | G06Q 50/01 |
| 2019/0251241 A1* | 8/2019 | Bykampadi | H04W 12/009 |
| 2019/0253894 A1* | 8/2019 | Bykampadi | H04L 67/51 |
| 2019/0312841 A1* | 10/2019 | Moses | H04L 67/56 |
| 2019/0312860 A1* | 10/2019 | Dykes | H04L 63/10 |
| 2019/0394041 A1* | 12/2019 | Jain | H04L 9/3213 |
| 2021/0029119 A1 | 1/2021 | Raman et al. | |
| 2021/0083873 A1* | 3/2021 | Harris | H04L 9/3297 |
| 2021/0390170 A1* | 12/2021 | Olden | G06F 21/604 |
| 2021/0392048 A1* | 12/2021 | Olden | H04L 41/0816 |
| 2021/0392132 A1* | 12/2021 | Olden | H04L 67/1095 |
| 2022/0051261 A1* | 2/2022 | Vetas | G06Q 10/0833 |
| 2022/0191193 A1* | 6/2022 | Hamilton | H04L 63/029 |
| 2022/0232003 A1* | 7/2022 | Smolny | H04L 63/0807 |
| 2022/0239484 A1* | 7/2022 | Farrell | H04L 9/0891 |
| 2022/0263825 A1* | 8/2022 | Gregus | H04L 67/1001 |
| 2022/0345491 A1* | 10/2022 | Luo | H04L 63/20 |
| 2023/0007045 A1* | 1/2023 | Klemetti | H04L 63/029 |

OTHER PUBLICATIONS

Juanita Koilpillai, Waverley Labs LLC, Software Defined Perimeter (SDP)1 a Primer for CIOs, URL:https://github.com/iamhrishikeshpadhye/Software-Definded-Perimeter/raw/master/Guides/Waverley%20Labs-SDP-White-paper.pdf [retrieved on May 6, 2021] p. 5-p. 10, Dec. 2017, 14 pages.

Jason Garbis et al: "Software-Defined Perimeter Architecture Guide", URL:https://cloudsecurityalliance.org/download/artifacts/sdp-architecture-guide-v2/ [retrieved on Jan. 21, 2020] p. 6-p. 14, p. 21-p. 23, Jan. 1, 2019, 40 pages.

Scott Rose et al: "Zero Trust Architecture NIST SP 800-207", NIST, National Institute of Standards and Technology (NIST), URL:https://nvlpubs.nist.gov/nistpubs/SpecialPublications/NIST.SP.800-207.pdf [ retrieved on Aug. 11, 2020], p. 4-p. 22, Aug. 11, 2020, 60 pages.

BeyondCorp, A New Approach to Enterprise Security, Rory Ward and Betsy Beyer, https://storage.googleapis.com/pub-tools-public-publication-data/pdf/43231.pdf.

What is Zero Trust Network Access (ZTNA), by Justin McCarthy, Co-Founder / CTO, strongDM, https://www.strongdm.com/blog/what-is-zero-trust.

Pulse Secure, KB23315—Pulse Secure Installer Service FAQ, https://kb.pulsesecure.net/articles/Pulse_Secure_Article/KB23315.

* cited by examiner

LIMITING DISCOVERY OF A PROTECTED RESOURCE IN A ZERO TRUST ACCESS MODEL

TECHNICAL FIELD

Certain embodiments relate, in general, to network security and, more specifically, to limiting discovery of a protected service. For example, certain embodiments leverage user identity and device identity to limit discovery of a protected service in a Zero Trust access model.

BACKGROUND

Traditional security approaches assume that anything (devices, users, infrastructure, etc.) inside the corporate network can be trusted. The reality is that this assumption no longer holds true. Now more than ever, employees and users have more control over the applications they use. Data and applications are no longer behind the firewall, and users can connect directly to work applications over the internet using personal owned devices. Zero Trust (ZT) can be summed up as "never trust; always verify." This security approach treats every access attempt as if it originates from an untrusted network, device and/or user—so access won't be allowed until trust is verified. Once users and devices have been deemed trustworthy, zero trust ensures that they have access only to the resources they absolutely need, to prevent any unauthorized lateral movement through an environment. Adoption of zero trust can help address common security challenges in the workforce, such as phishing, malware, credential theft, remote access, and device security (such as bring your own device (BYOD) security). This is done by securing users, their devices, and the applications that they access.

DESCRIPTION OF EXAMPLE EMBODIMENTS

Overview

Figure 1:
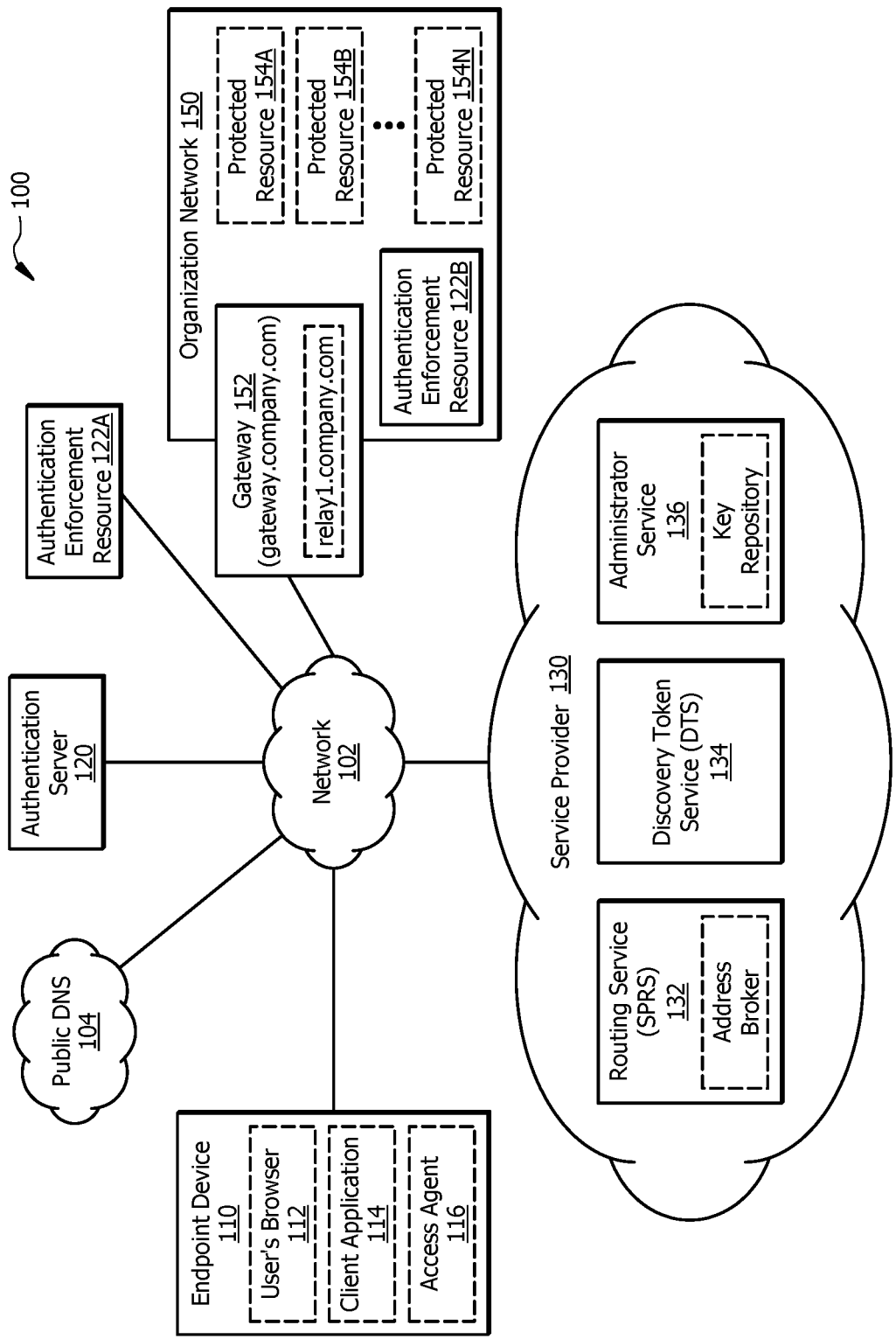
FIG. 1 illustrates an example of a system, in accordance with certain embodiments.

According to an embodiment, a system comprises one or more processors and one or more computer-readable non-transitory storage media comprising instructions that, when executed by the one or more processors, cause one or more components of the system to perform operations. The operations comprise determining that an endpoint device has requested to discover the location of a protected resource that is protected by a gateway, determining whether the endpoint device has provided a token that is valid, and permitting the endpoint device to discover the location of the protected resource based on determining that the endpoint device has provided the token that is valid. The token indicates that the endpoint device successfully completed a first multi-factor authentication procedure in connection with accessing an authentication enforcement resource. An authentication enforcement resource refers to a resource protected by enforcing multi-factor authentication. Examples of systems and methods for enforcing multi-factor authentication are further described in the "Example Embodiments" section below.

According to another embodiment, a method comprises determining that an endpoint device has requested to discover a location of a protected resource that is protected by a gateway, determining whether the endpoint device has provided a token that is valid, and permitting the endpoint device to discover the location of the protected resource based on determining that the endpoint device has provided the token that is valid. The token indicates that the endpoint device successfully completed a first multi-factor authentication procedure in connection with accessing an authentication enforcement resource.

According to yet another embodiment, one or more computer-readable non-transitory storage media may embody instructions that, when executed by a processor, cause the performance of operations. The operations comprise determining that an endpoint device has requested to discover a location of a protected resource that is protected by a gateway, determining whether the endpoint device has provided a token that is valid, and permitting the endpoint device to discover the location of the protected resource based on determining that the endpoint device has provided the token that is valid. The token indicates that the endpoint device successfully completed a first multi-factor authentication procedure in connection with accessing an authentication enforcement resource.

Technical advantages of certain embodiments of this disclosure may include one or more of the following. Certain embodiments may improve network security in a ZT access model. In a ZT access model, resources can be made accessible to a trusted endpoint device and user regardless of the network they are on. As a side effect, in existing ZT access models, resources can also be discoverable from public networks and not-yet-trusted devices, which may raise security concerns. To address this problem, certain embodiments approach ZT enablement through use of a gateway that can limit reconnaissance by not-yet-trusted devices and can protect multiple resources behind a single relay. For example, the gateway and associated cloud services may require each endpoint device to establish a minimum level of trust before allowing that endpoint to obtain a resource-relay mapping.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In existing and emerging Zero-Trust access models, resources are placed out for any endpoint device to ping. Such ZT access models rely on the authentication system to protect the resources. Certain embodiments of the present disclosure add an extra layer of protection. The extra layer of protection requires an endpoint device to establish a minimum level of trust before the endpoint device is permitted to discover the internet-exposed relays to authenticate through. The endpoint device can establish the minimum level of trust implicitly through existing device-based and identity-based policies.

Certain examples will be described below with reference to components provided by Duo. These examples are non-limiting, and they are provided for purposes of explanation and description only. Other embodiments may use other components, such as one or more components provided by entities other than Duo.

In certain embodiments, an endpoint device is configured with an access agent (such as a DuoConnect application running on the endpoint device). The access agent is associated with a user account. The user account may be configured with a gateway (such as a Duo Network Gateway (DNG)) and/or with a service provider (such as Duo). A service provider may provide one or more services, such as cloud services, associated with the gateway. The gateway and associated services may be configured to support a ZT experience. In an embodiment, the endpoint device requests access to any authentication enforcement resource (e.g., a resource that enforces multi-factor authentication, such as two-factor authentication (2FA)). Successful multi-factor authentication of the endpoint device prompts the service provider to silently deliver (or refresh) credentials (e.g., a token) to the endpoint device. The credentials are configured to allow the user to later use the endpoint device to dispatch reverse-lookups to a global address broker service. The global address broker service may be provided by the service provider in certain embodiments.

Certain embodiments of the present disclosure involve adding one or more new services into a network security model. Once such new service may be referred to as a Discovery Token Service ("DTS"). In certain embodiments, the Discovery Token Service may be served by an existing address broker provided by the service provider, or the Discovery Token Service may be a standalone service. The Discovery Token Service may be configured to generate one or more tokens upon a valid request (based on successful completion of multi-factor authentication by the endpoint device or a request from another service using a pre-shared secret for verification) and to deliver the token(s) to the access agent running on the endpoint device. The tokens may be signed using an asymmetric public/private key pair that is deterministically generated from a pre-shared secret, such as an s-key associated with a new ZT integration, a public/private key pair where the public key is widely accessible through a well-known internet location, or symmetrically encrypted using a shared secret known to the DTS and gateways(s) verifying the identity of the endpoint device.

In an embodiment, when a new ZT integration is created, the corresponding key information (symmetric or asymmetric) is sent from a key repository. The key repository may be associated with an administrator service (such as a Duo Admin Panel). The key may be sent to the address broker to be persisted under that user's account identifier and the integration's integration identifier. The key may be given to the administrator to use during configuration of the gateway. In the case of asymmetric encryption, the key may also be hosted publicly for the gateway(s) and address broker(s) to access using the integration identifier.

During the multi-factor authentication (e.g., 2FA) process, one or more agents may run on the endpoint device. One or more of the agents running on the endpoint device may be configured to control access to resources by using a policy system to restrict access if the endpoint device does not meet particular security requirements. Examples of such an agent may include a health check agent (such as an agent provided by a device health application) or an access agent (such as DuoConnect). The health check agent may be configured to perform a health check, and the access agent may be configured to perform a posture check. Performing the health check may prompt one or more queries to be sent to the health check agent (or, performing the posture check may prompt one or more queries to be sent to the access agent). The one or more queries check for one or more discovery tokens already present on the endpoint device. Upon successful 2FA, the prompt redirects a browser running on the endpoint device to the Discovery Token Service if the following three conditions are met: (1) the service provider has enabled the feature for the customer (2) the customer configures a ZT integration, and (3) an expired or empty token is presented for the scope (account identifier). The redirect goes to the Discovery Token Service with a signed uniform resource locator (URL) with a format similar to "/token?a-key=000&action=new&expires= TITTTT& sig=YYYYYY". The sig=parameter is a verifiable signature generated with a corresponding private key or pre-shared secret, readily verifiable by the Discovery Token Service.

The Discovery Token Service verifies the validity of the request, then uses the account identifier to retrieve the pre-shared secret of the ZT integration and—if necessary—recalculates the public/private key pair. It then generates a token indicating the scope, signs it with the private key, and redirects to a web page that sends the token to the endpoint device. For example, the token may be sent to the access agent running on the endpoint device so that the access agent can persist the token. The token can be delivered through a cookie or a request to the access agent directly.

Upon attempting to execute a reverse-mapping to discover hostname of the specific gateway (such as the DNG) hosting a protected service, the access agent sends a communication to the address broker attaching a bundle of its current tokens. The address broker cross-references the Carrier Grade Network Address Translation (CGNAT) Internet Protocol (IP) address of the incoming request to the target gateway (previously recorded by the address broker during address assignment) and inspects the token bundle for a token corresponding to the target gateway and the integration identifier of the ZT integration that it is configured with. The address broker then queries its database of public key mappings (recorded when an integration is generated) to verify the token before finally replying with the target gateway to be used.

Thus, unlike the traditional ZT approach, certain embodiments add a layer of protection before an attacker can find the secure URL (e.g., https://URL) to authenticate against for access to a resource. An advantage of certain embodiments is that the user of an endpoint device does not have to explicitly register or re-register for yet another credential or be aware of the process taking place. Additionally, unlike certain existing approaches, discoverability does not imply authorization to establish a connection, and does not happen immediately at login.

Ordinarily, this process would require configuration at the endpoint device, which would be provisioned by a systems administrator to the organization's different managed endpoint devices. Certain embodiments of the solution disclosed herein establish an automated flow to establish a minimum level of trust before allowing a not-yet-authorized endpoint device to obtain a resource-relay mapping. The above-described techniques may be implemented in any suitable system, such as system 100 shown in FIG. 1.

FIG. 1 illustrates an example of a system 100, in accordance with certain embodiments. The example system 100 illustrated in FIG. 1 comprises a network 102 that communicatively couples a Domain Name System (DNS), such as public DNS 104, an endpoint device 110, an authentication server 120, an authentication enforcement resource 122, a service provider 130, and an organization network 150.

In general, a user of endpoint device 110 authenticates with authentication server 120 in connection with accessing authentication enforcement resource 122. The authentication server 120 may perform a procedure that comprises authenticating a first authentication factor and a second authentication factor. Authenticating the first authentication factor may comprise verifying that endpoint 110 device has provided valid login credentials associated with the user. Examples of login credentials include a username and password. Authenticating the second authentication may comprise performing a real-time verification of the user of endpoint device 110. For example, authentication server 120 may verify whether the user of the endpoint device 110 responds affirmatively and promptly to a prompt (e.g., a Duo prompt, such as a Duo push) configured or managed by service provider 130. Examples of a real-time verification that may be used as a second authentication factor are further discussed below.

Based on successful authentication of the first authentication factor and the second authentication factor, service provider 130 may provide endpoint device 110 with one or more tokens. The one or more tokens may be provided implicitly, without the user being aware. Later, endpoint device 110 may seek to discover a location of a protected resource 154 (e.g., a resource associated with an organization network 150 and protected by gateway 152). Service provider 130 may determine whether to permit discovery of a resource-relay mapping based on whether endpoint device 110 provides a valid token. In particular, in response to endpoint device 110 providing a valid token, service provider 130 permits endpoint device 110 to discover the resource-relay mapping associated with the protected resource 154. After obtaining the resource-relay mapping, endpoint device 110 may request access to protected resource 154 on behalf of the user. Gateway 152 may facilitate authentication of the user of endpoint device 110 to determine whether to permit access to protected resource 154.

Network 102 may comprise all or a portion of one or more networks that facilitate communication among components of system 100. As an example, network 102 may comprise at least a portion of an ad hoc network, a personal area network (PAN), a local area network (LAN), a wide area network (WAN), a metropolitan area network (MAN), one or more portions of the Internet, and/or a combination of two or more of these. One or more portions of one or more of these networks may be wired or wireless. As an example, in an embodiment, endpoint device 110 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The wireless network may facilitate communication between endpoint device 110 and one or more portions of the Internet.

Public DNS 104 may refer to a naming system for locating computers or other resources connected via network 102. For example, public DNS 104 may translate domain names (names that tend to be user-friendly/memorable to a user) to the numerical IP addresses needed for locating the underlying resources on network 102. In response to a user of endpoint device 110 seeking access to a domain name, endpoint device 110 may request the IP address associated with the requested domain name from public DNS 104.

Endpoint device 110 may refer to a device that a user uses to communicate with other components of system 100 via network 102. Examples of an endpoint device 100 may include a desktop computer system, a laptop or notebook computer system, a mobile telephone (such as a smartphone), a personal digital assistant (PDA), a tablet computer system, and so on. In certain embodiments, a user may be associated with multiple endpoint devices 110. As an example, the user may use a first endpoint device 110 (such as the user's laptop) to seek access to authentication enforcement resource 122 and protected resource 154. The user may use a second endpoint device 110 (such as the user's mobile phone) to receive and respond to certain authentication factors. For example, the user may have an account established with service provider 130, and the user may have pre-configured the account such that second authentication factors are pushed to an app running on the user's mobile phone. As one example, the user may have an account established with Duo, and the user may have pre-configured the account such that authentication prompts, such as Duo-pushes, are pushed to a Duo Connect application running on the user's mobile phone.

In certain embodiments, endpoint device 110 comprises a user's browser 112, one or more client applications 114, and one or more agents, such as access agent 116. As an example, user's browser 112 may comprise a web browser (e.g., application software for accessing the World Wide Web). When a user follows a Uniform Resource Locator (URL) of a web page from a particular website, the web browser retrieves the necessary content from the website's web server and then displays the page on the user's endpoint device 110. Client application 114 may comprise a computer program configured to carry out a specific task used by the user. Examples of a client application 114 may include a remote desktop application, an email application, a word processing application, a spreadsheet application, a slide presentation application, a media player application, a business-specific application (such as accounting software), or other application. In certain embodiments, client application 114 comprises a thick application (e.g., an application that runs on endpoint device 110, for example, such that most of the logic is handled locally by endpoint device 110). An access agent 116 may allow endpoint device 110 to communicate directly or indirectly with service provider 130 in order to facilitate access to resources, such as an authentication enforcement resource 122 or a protected resource 154. In certain embodiments, the access agent can be built into the operating system As described above, endpoint device 110 may need to provide service provider 130 with one or more valid tokens before permitting endpoint device 110 to discover a location of protected resources 154. Authentication server 120 may facilitate a multi-factor authentication (e.g., 2FA) procedure that allows for delivery of the one or more tokens to endpoint device 110 (e.g., via service provider 130). For example, prior to seeking discovery of protected resources 154, endpoint device 110 may authenticate with authentication server 120 in connection with accessing an authentication enforcement resource 122.

An authentication enforcement resource 122 may refer to a resource for which multi-factor authentication is enforced. Depending on the embodiment, an authentication factor may be enforced by authentication server 120, authentication enforcement resource 122 itself, service provider 130, gateway 152, and/or other suitable component. Certain embodiments enforce each authentication factor at the same component (as one example, authentication server 120 may enforce both the first authentication factor and the second authentication factor), and other embodiments use more than one component to enforce the authentication factors (as one example, authentication server 120 may enforce the first authentication factor, and service provider 130 may enforce the second authentication factor). In certain embodiments, multiple components may work together to enforce an authentication factor (as one example, authentication server 120 may enforce an authentication factor based at least in part on information provided by service provider 130, or vice versa).

An authentication enforcement resource 122 may be located outside of organization network 150 (as shown in FIG. 1 by a first authentication enforcement resource 122A), or an authentication enforcement resource 122 may be located within organization network 150 (as shown in FIG. 1 by a second authentication enforcement resource 122B behind gateway 152). In certain embodiments, endpoint device 110 communicates with authentication enforcement resource 122 via a browser. In such embodiments, authentication enforcement resource 122 may be any resource that is accessed through the browser and protected by multi-factor authentication. As an example, endpoint device 110 may communicate with authentication enforcement resource 122 via user's browser 112. As another example, endpoint device 110 may communicate with authentication enforcement resource 122 via an embedded browser of client application 114 or an external browser triggered by client application 114. As one example, client application 114 may comprise a secure shell (SSH) client that includes an embedded browser or is configured to trigger an external browser. Certain embodiments, such as embodiments that authenticate an authentication enforcement resource 122A located outside of organization network 150, enforce this multi-factor authentication independently of gateway 152 (e.g., without involving gateway 152). Certain embodiments, such as embodiments that authenticate an authentication enforcement resource 122B located within organization network 150, may involve gateway 152 when enforcing this multi-factor authentication.

A user may obtain the one or more tokens based on performing authentication in connection with accessing any of a plurality of authentication enforcement resources 122. That is, the authentication enforcement resource 122 need not be related to a particular protected resource 154 that endpoint device 110 later seeks to discover. In other words, the user may access authentication enforcement resource 122 simply because the user wants to use that authentication enforcement resource 122 (not because the user is specifically trying to authenticate to discover a location of protected resource 154). Endpoint device 110 can obtain one or more tokens based on performing authentication in connection with accessing a first authentication enforcement resource 122 and may later refresh the one or more tokens based on performing authentication in connection with accessing a second (different) authentication enforcement resource 122. In this manner, system 100 provides flexibility to deliver the one or more tokens implicitly to the user whenever the user performs the multi-factor authentication (based on whichever application/feature the user is interested in using at the time). The one or more tokens may be stored for later use such that whenever the user decides to discover and access a protected resource 154 (based on whichever protected application/feature/service the user is interested in using at the time), the one or more tokens can be validated.

As an example, suppose the user interacts with a browser (user's browser 112, or a browser embedded in or triggered by client 114) to access paystub information through a web application represented by an authentication enforcement resource 122. The authentication enforcement resource 122 may be located outside of organization network 150 such that it is not protected by gateway 152 (e.g., authentication enforcement resource 122A of FIG. 1), or the authentication enforcement resource 122 may be located inside organization network 150 (e.g., authentication enforcement resource 122B of FIG. 1). The user may interact with the browser in order to log into an account associated with the user and to retrieve the user's pay stub data. Logging into the user's account may comprise performing multi-factor authentication. For example, a first authentication factor may check the user's login credentials (e.g., username and password). In certain embodiments, the second authentication factor may comprise a real-time verification factor. After successfully completing multi-factor authentication of the user, the one or more tokens are provided to endpoint device 110. The one or more tokens may be used to facilitate subsequent discovery of a protected resource 154 protected by gateway 152.

In certain embodiments, authentication associated with a browser-based application allows for token delivery, and token delivery allows for later discovery of one or more protected resources 154, such as non-browser-based resources, protected by gateway 152. Gateway 152 may then enforce any suitable authentication or policies to permit endpoint device 110 to access a protected resource 154. In certain embodiments, protected resource 154 may facilitate use of client application 114 (e.g., a thick application). As one example, certain embodiments implement a remote desktop application as a thick application, and the protected resource 154 may comprise data (such as files belonging to an organization) secured by gateway 152 and accessed by the remote desktop of the authenticated/authorized endpoint device 110.

As discussed above, the multi-factor authentication procedure may include a real-time verification factor. The real-time verification comprises any suitable verification that obtains an input from the user in real time. The real-time verification of the user may be performed in any suitable manner. As an example, the real-time verification may ask the user to supply a one-time passcode (e.g., a passcode pushed to or generated by an application running on the user's smartphone or computer, a passcode obtained from a hardware token issued to the user, a passcode sent to the user by text message or phone call, etc.). As another example, the real-time verification may ask the user to acknowledge a notification, such as by accepting a prompt pushed to the user's smartphone or computer via an application or text message, or by accepting a phone call notification (e.g., by pressing "1" or saying "yes" when prompted). In embodiments implemented using a Duo system, the real-time verification may be a Duo prompt (such as a Duo push, which may push a login request to an endpoint device 110 associated with the user—the user reviews the login request and taps Approve to log in).

The real-time verification may be performed using any suitable endpoint device 110 associated with the user (e.g., computer, smartphone, landline phone, hardware token). The endpoint device 110 may be the same endpoint device 110 as that used to authenticate with and then access authentication enforcement resource 122 and to discover then access the protected resource 154, or a different endpoint device 110 associated with the user may be used. As an example, the user may seek to access the authentication enforcement resource 122 and to discover then access the protected resource 154 using a laptop of the user. In one embodiment, the real-time verification may be performed using the same laptop. In another embodiment, the real-time verification may be performed using a different endpoint device 110, such as the user's smartphone. For example, authentication server 120 may authenticate login credentials (e.g., username and password) received from the user's laptop and may then push a real-time verification request to the user's smartphone. The authentication may determine to push the real-time verification request to the user's smartphone based on information configured for a user account that service provider 130 associates with the user. For example, the user may have pre-configured the user account to send real-time verification requests to the user's smartphone.

Service provider 130 comprises one or more services, such as a service provider routing service (SPRS) 132, a discovery token service (DTS) 134, and an administrator service 136. Services provided by service provider 130 may be combined or separated in any suitable manner. Certain embodiments may comprise multiple service providers 130 that each provide one or more of the various services.

In certain embodiments, SPRS 132 may comprise an address broker. SPRS 132 may receive an indication that endpoint device 110 is attempting to execute a reverse-mapping to discover a location of a protected resource 154, may communicate with endpoint device 110's access agent 116 to verify whether endpoint device 110 has one or more valid tokens and, based on verifying that endpoint device 110 has one or more valid tokens, may provide a reply indicating a gateway 152 and/or a relay to be used. To indicate the relay to be used, certain embodiments provide a resource-relay mapping. As mentioned, in certain embodiments, SPRS 132 indicates to endpoint device 110 the relay to be used. In other embodiments, SPRS 132 indicates to endpoint 110 the gateway 152 (e.g., SPRS 132 may leave it to gateway 152 to verify the token(s) and to indicate to endpoint device 110 the relay to be used). Information indicating the gateway 152 and/or relay to be used allows endpoint device 110 to discover a location of a protected resource 154. To actually access protected resource 154, endpoint device 110 performs authentication, which may be managed by gateway 152.

DTS 134 may be configured to generate one or more tokens based on the user successfully completing multi-factor authentication in connection with accessing authentication enforcement resource 122 or a protected resource 154 (e.g., 154A, 154B, . . . and/or 154N) if the protected resource 154 is accessed through a browser. The one or more tokens may be delivered to endpoint device 110 via service provider 130. As an example, in certain embodiments, service provider 130's DTS 134 may deliver the one or more tokens to endpoint device 110. As another example, in certain embodiments, service provider 130's SPRS 132 may obtain the tokens from DTS 134, and SPRS 132 may deliver the one or more tokens to endpoint device 110. As described above, providing endpoint device 110 with the one or more tokens in connection with accessing authentication enforcement resource 122 may prepare endpoint device 110 to later discover a location of a protected resource 154.

Administrator service 136 may be configured to manage a multi-factor authentication system. As examples, administrator service 136 may be configured to create and/or manage applications, enroll and/or activate users, issue and/or manage passcodes, issue and/or manage bypass codes, manage mobile devices, fine-tune the user experience, configure and/or manage services of service provider 130, and/or provide other suitable functionality. In certain embodiments, administrator service 136 may comprise a key repository. The key repository can be configured to facilitate providing the owner of gateway 152 with one or more keys that enable gateway 152 to facilitate communication with one or more services of service provider 130, such as SPRS 132, and/or to facilitate communication with one or more endpoint devices 110.

Organization network 150 may comprise a gateway 152 and one or more protected resources 154. In an embodiment, organization network 150 may comprise a LAN associated with a particular organization (such as a company that employs the user or a company for which the user is a customer), and gateway 152 may protect protected resources 154 associated with organization network 150. In certain embodiments, gateway 152 allows the user to access the organization's on-premises websites, web applications, and Secure Shell (SSH) servers without having to worry about managing virtual private network (VPN) credentials, while also adding login security with multi-factor authentication that includes a real-time verification factor (such as a Duo Prompt in the case of implementations that use a Duo system). In certain embodiments, gateway 152 facilitates secure access to the organization's internal web applications from any endpoint device 110, using any user's browser 112 (e.g., Chrome, Firefox, Safari, Edge, Opera, Internet Explorer, etc.), from anywhere in the world, without having to install or configure remote access software on endpoint device 110. In certain embodiments, gateway 152 may communicate with service provider 130 to facilitate security.

The one or more protected resources 154 may comprise one or more resources within organization network 150 and protected by gateway 152. For example, the user may be an employee of the organization, such as a company, and the one or more protected resources 154 may comprise, network-based applications or services that facilitate accessing data, files, or other information protected by the company's organization network 150 (which may be a private network of the organization).

An example of a protected resource 154 may include a service that the user accesses via a browser running on endpoint device 110 (such as user's browser 112 or a browser embedded in or triggered by client application 114). In an embodiment, the browser navigates to a URL associated with the organization (such as application.company.com, which may result in the user's traffic going through the gateway 152 at gateway.company.com). Navigating to the URL may prompt access agent 116 to facilitate verification of the user. For example, access agent 116 may communicate with service provider 130 to provide service provider 130 with one or more tokens for discovering locations of protected resources 154. After end point 110 provides the one or more tokens to service provider 130, service provider 130 may verify that the tokens are valid and may then permit endpoint device 110 to obtain a resource-relay mapping for discovering locations of protected resources 154 of organization network 150 (such as resources that are accessed through a client application 114). The resource-relay mapping may indicate a location of protected resource 154 on organization network 150. In certain embodiments, service provider 130 may communicate with gateway 152 to facilitate verifying the tokens and providing the resource-relay mapping to endpoint device 110. After receiving the resource-relay mapping, endpoint device 110 may then request access to one or more protected resources 154. Assuming that endpoint device 110 passes authentication (which may be multi-factor authentication managed by gateway 152), endpoint device 110 may be provided with access to the requested protected resource(s) 154. As an example, endpoint device 110 may be permitted to establish a Transmission Control Protocol (TCP) connection to access the requested protected resource(s) 154.

In this manner, in certain embodiments, system 100 adds another level of security by requiring endpoint device 110 to pass a first multi-factor authentication (e.g., 2FA) in order to discover the resource-relay mapping associated with the protected resource 154, and to pass a second multi-factor authentication (e.g., 2FA performed using gateway 152) in order to access the protected resource 154. The first multi-factor authentication is performed for whichever authentication enforcement resource 122 the user decides to access, whenever the user decides to access it, in order to implicitly deliver the one or more tokens so that the one or more tokens are available when the user later seeks to access the protected resource 154. Thus, the authentication enforcement resource 122 need not be related to the protected resource 154 (the user may authenticate with authentication enforcement resource 122 for a purpose other than discovering a location of protected resource 154, and the token may be provided implicitly without the user necessarily being aware of it). The one or more tokens may be provided asynchronously so that the endpoint device 110 is able to discover the location of the protected resource 154 whenever the user decides to access the protected resource 154.

Certain embodiments may provide a backup (manual) process to obtain a token. For example, if the user seeks to discover and access a protected resource 154 before/without having performed authentication in connection with accessing an authentication enforcement resource 122, the backup process may force a multi-factor authentication that prompts delivery of the token to end device 110.

In certain embodiments, each token may be associated with an expiration value. As an example, the expiration value may be an express expiration time, or it may be timer based (e.g., the timer may elapse after a certain amount of time or a certain amount of idle time). If the token expires, service provider 130 may prompt end device 110 to refresh the token before permitting end device 110 to discover a location of protected resource 154. Certain embodiments may trigger the backup (manual) token-delivery process in the event that a token previously delivered to endpoint device 110 has expired. As an example, suppose that in connection with authenticating with authentication enforcement resource 122, endpoint device 110 receives a token that expires in 24 hours. If the 24 hour period expires without refreshing the token (e.g., the user does not access any authentication enforcement resource 122 within the 24 hour period), then the user would need to refresh the token (either in connection with a new authentication with any authentication enforcement resource 122 or via the backup process) in order to be able to discover the location of a protected resource 154.

Certain embodiments facilitate discovery of protected resource 154 in a Zero Trust access model. Discovery can occur without requiring endpoint device 110 to establish a tunnel, such as a VPN tunnel, with organization network 150. However, instead of permitting any and all endpoint devices 110 to discover the location of protected resource 154, certain embodiments limit discovery of the location of protected resource 154 to a subset of endpoint devices 110 that have established a minimum level of trust. The minimum level of trust may be demonstrated by supplying a valid token (the token that endpoint device 110 obtained implicitly in connection with authenticating the user's access to authentication enforcement resource 122). After discovering the location of protected resource 154, the user may then be required to proceed with normal authentication for accessing protected resource 154.

In one example, the authentication enforcement resource 122 may be an email service and the protected resource 154 may be an organization's web-conferencing service (such as a WebEx application protected by gateway 152). When the user authenticates access to the user's email via endpoint device 110, a token may be delivered to endpoint device 110 that facilitates subsequent discovery of a location of the organization's web-conferencing service. When the user requests to join the organization's web-conferencing service, endpoint device 110 can use the token to resolve the IP address where to connect to the organization's web-conferencing service. Without that token, endpoint device 110 would not be able to find the organization's web-conferencing service.

Certain embodiments may allow service provider 130 and/or gateway 152 to apply different policies depending on whether endpoint device 110 is untrusted, minimally trusted, or trusted. An untrusted endpoint device 110 does not have any valid token. A minimally trusted endpoint device 110 has a valid token, but has not yet passed multi-factor authentication managed by gateway 152. A trusted endpoint device 110 has a valid token and has passed multi-factor authentication managed by the gateway 152 (and the multi-factor authentication has not expired or otherwise become invalid).

Figure 2:
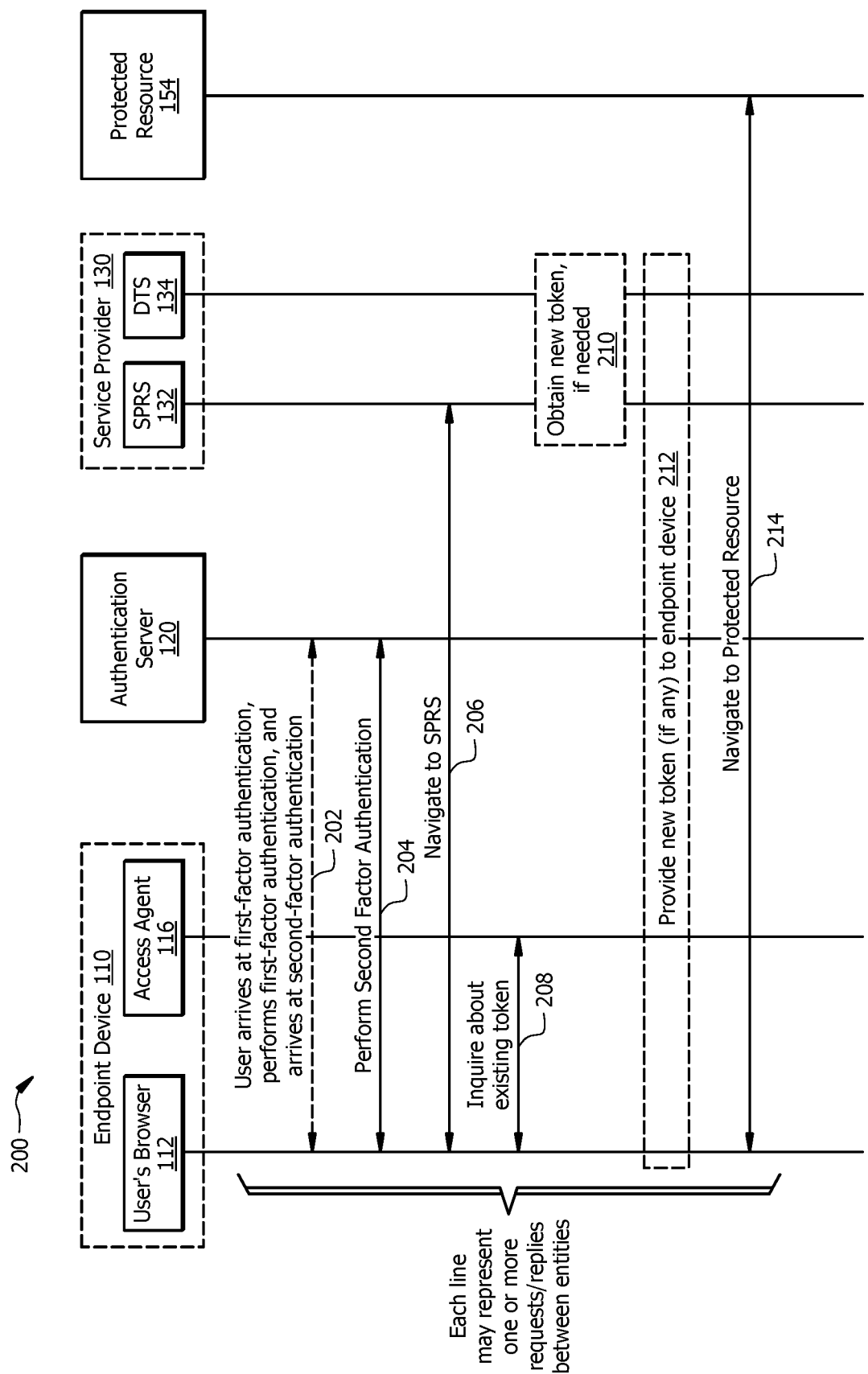
FIG. 2 illustrates an example message flow diagram, in accordance with certain embodiments.

FIG. 2 illustrates an example of a message flow diagram 200 depicting messages communicated between endpoint device 110 (comprising user's browser 112 and access agent 116), authentication server 120, service provider 130 (comprising SPRS 132 and DTS 134), and protected resource 154. The components illustrated in FIG. 2 may be analogous to like-numbered components in FIG. 1. Each message flow line in FIG. 2 may represent one or more requests and/or replies between entities.

At message 202, a user may arrive at authentication sever 120 (via the user's browser 112) and may successfully perform first-factor authentication, such as verification of login credentials (e.g., username and password). The user then arrives at second-factor authentication. At message 204, the user performs second factor authentication, resulting in a redirect to SPRS 132 with parameters. At message 206, the user's browser 112 navigates to SPRS 132. At message 208, a page at SPRS 132 results in a request to local access agent 116, inquiring about existing tokens. If access agent 116 cannot provide valid tokens, SPRS 132 may request new tokens from DTS 134, as shown in message 210. In an embodiment, SPRS 132 and DTS 134 are both provided by the same Service Provider 130 (Duo, as an example) and can freely talk to one another. DTS 134 generates the new token(s) based on verifying that the user of endpoint device has successfully completed multi-factor authentication (e.g., 2FA of messages 202 and 204) (and that the multi-factor authentication has not expired or otherwise become invalid). At message 212, service provider 130 delivers the new token(s) (if any) to endpoint device 110. For example, SPRS 132 or DTS 134 may provide the new token(s) (if any) to user's browser 112, user's browser 112 may provide the new token(s) to access agent 116, and access agent 116 saves the tokens. In message 214, user's browser 112 receives a redirect to protected resource 154 and the user's browser 112 navigates to protected resource 154.

Figure 3:
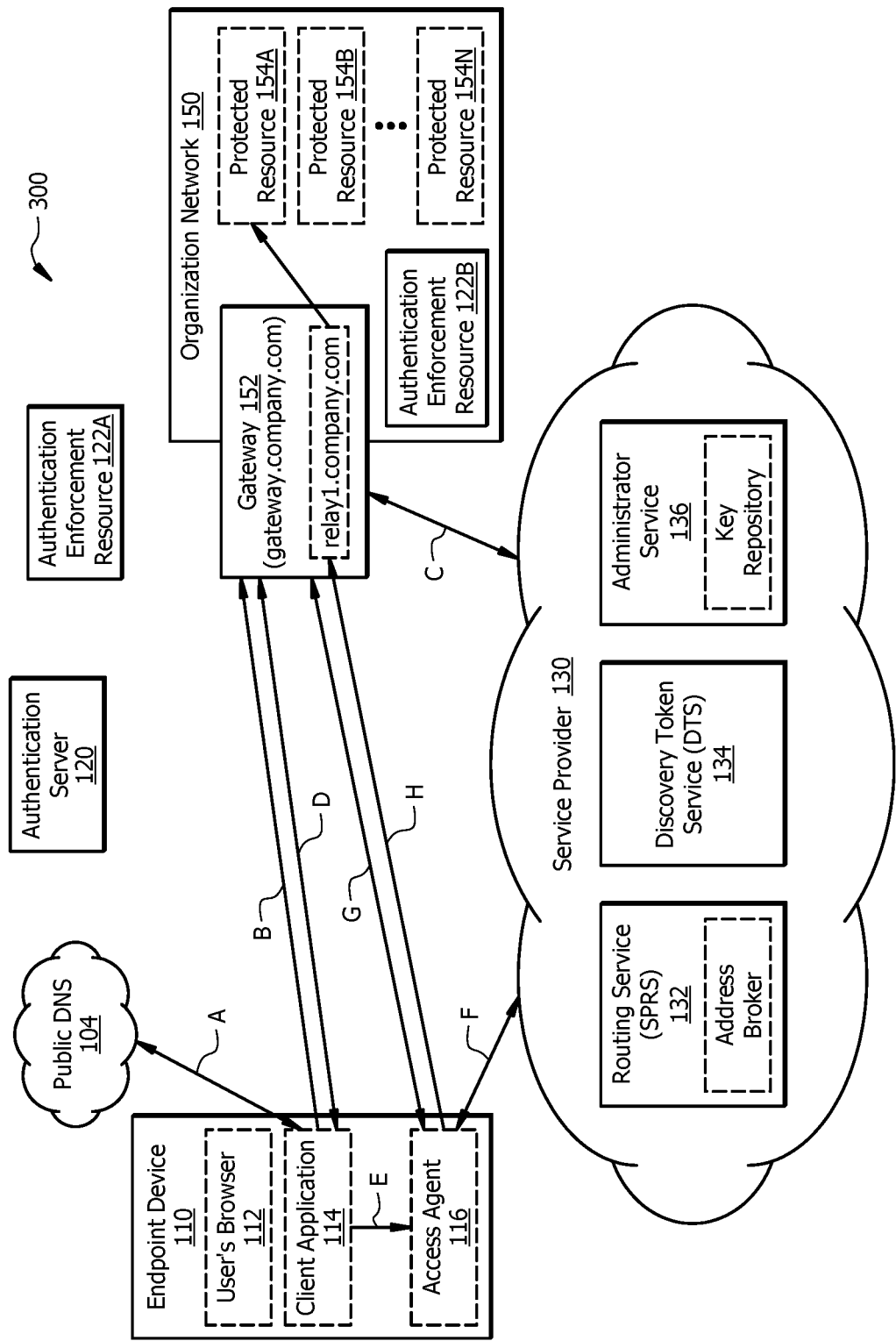
FIG. 3 illustrates an example of an authentication procedure performed by a system, in accordance with certain embodiments.

FIG. 3 illustrates an example of certain messages that may be communicated between components of system 100 shown in FIG. 1. Network 102 is not shown in FIG. 3 in order to simplify the illustration, however, the messages shown in FIG. 3 may be communicated via network 102. Each message shown in FIG. 3 may represent one or more requests and/or responses between the entities.

Endpoint device 110's client application 114 sends message A to public DNS 104 in an attempt to discover an IP address of a protected resource 154 (such as a service that a user seeks to use). Public DNS 104 responds with information indicating to ask a specific name server (gateway 152).

Client application 110 sends message B to gateway 152 (via an address associated with gateway.company.com) in an attempt to discover the IP address of the protected resource 154. In response, gateway 152 negotiates an unused local IP address with service provider 130 (e.g., via SPRS 132), as indicated by message C. Gateway 152 receives an IP address in a pre-determined range (ip1).

Gateway 152 sends endpoint device 110 a reply, as shown by message D. The reply indicates to use (ip1) as the IP address for protected resource 154. Endpoint device 110's access agent 116 may then listen on (ip1).

Message E illustrates that access agent 116 receives a connection request on (ip1:port1).

In response, access agent 116 and service provider 130 communicate messages F. Messages F include an attempt by access agent 116 to recover the intended gateway 152 from service provider 130 (e.g., via SPRS 132) using implicitly delivered token(s). Service provider 130 (e.g., via SPRS 132) verifies the token(s) and replies with the gateway domain name.

Message G illustrates that access agent 116 attempts to recover intended relay from gateway 152 using (ip1:port1) and the implicitly delivered tokens. Gateway 152 verifies token(s) and replies with relay domain name.

In message H, access agent 116 initiates normal authentication against relay with (ip1:port1). Access agent 116 may access the protected resource 154 after successful authentication.

Figure 4:
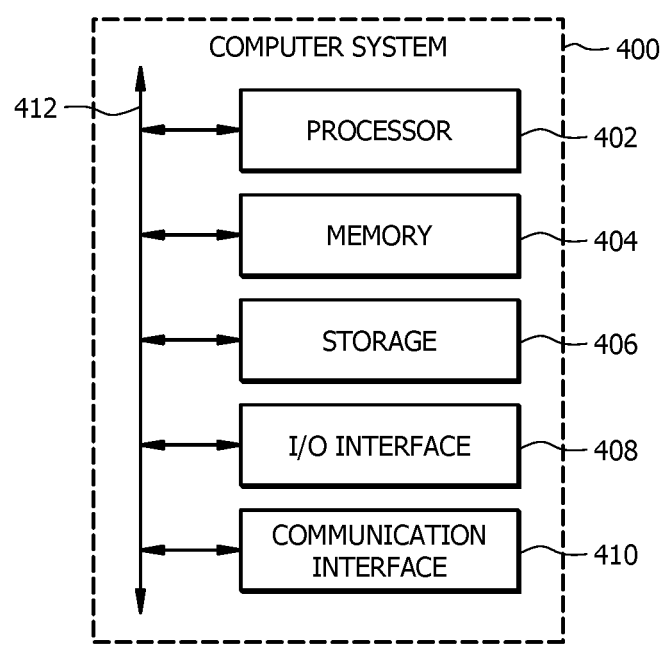
FIG. 4 illustrates an example of a computer system, in accordance with certain embodiments.

Reference is now made to FIG. 4, wherein is shown an example computer system 400 which may be used by the systems and methods described herein. As an example, one or more computer systems 400 may be used to provide at least a portion of a network 102, a public DNS 104, an endpoint device 110, an authentication server 120, an authentication enforcement resource 122, a service provider 130 or a service thereof (such as SPRS 132, DTS 134, or administrator service 136), an organization network 150 or a component thereof (such as a gateway 152 or a protected resource 154), and/or other component or functionality described with respect to FIG. 1. As another example, one or more computer systems 400 may be used to perform one or more steps described with respect to FIG. 2, FIG. 3, and/or FIG. 5. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 5:
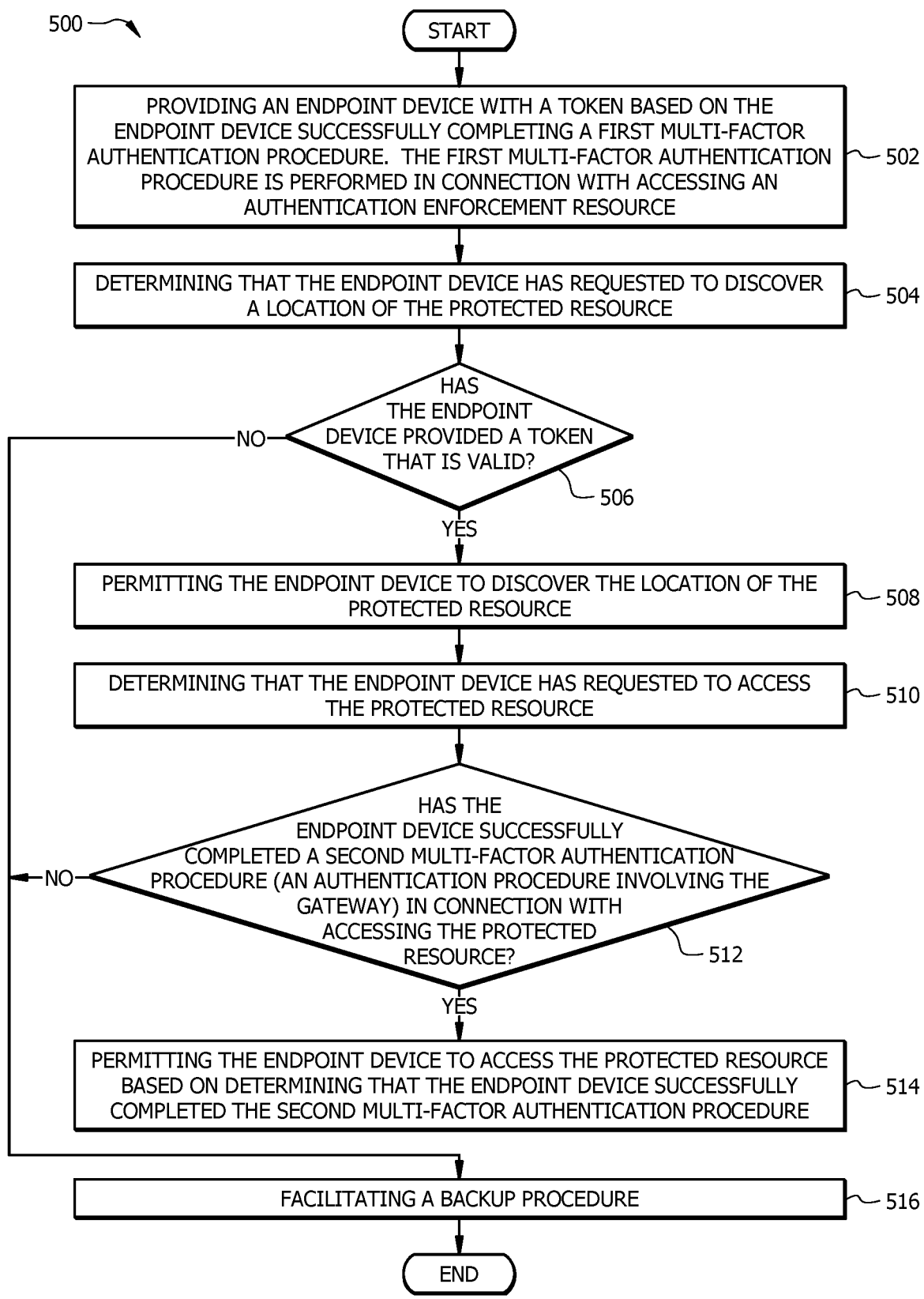
FIG. 5 illustrates an example of a method, in accordance with certain embodiments.

FIG. 5 illustrates an example of a method 500, in accordance with certain embodiments. In certain embodiments, the method may be performed by one or more components of system 100 described with respect to FIGS. 1-3. As described above, one or more components of system 100 may be implemented using a computer system, such as computer system 400 described with respect to FIG. 4. In certain embodiments, method 500 may be performed by a system (such as system 100) that provides a Zero Trust access model. Method 500 may require an endpoint device 110 to establish a minimum level of trust in order for the endpoint device 110 to discover a location of a protected resource 154. Endpoint device 110 may demonstrate the minimum level of trust by providing a token that is valid, as further described below.

In certain embodiments, method 500 begins at step 502 with providing endpoint device 110 with a token. The token may be provided to endpoint device 110 based on endpoint device 110 successfully completing a first multi-factor authentication procedure (such as a 2FA procedure) in connection with accessing an authentication enforcement resource 122. In some embodiments, authentication enforcement resource 122 can be external to organization network 150 (such as authentication enforcement resource 122A of FIG. 1) and the first multi-factor authentication procedure may be performed independently of gateway 152 (e.g., method 500 does not require the authentication enforcement resource 122 to be a resource protected by gateway 152). In other embodiments, authentication enforcement resource 122 can be a resource that is within organization 150 (e.g., protected by gateway 152) (such as authentication enforcement resource 122B of FIG. 1). In certain embodiments, endpoint device 110 communicates with authentication enforcement resource 122 via a browser, such as user's browser 112 or a browser embedded in or triggered by client application 114.

In certain embodiments, the first multi-factor authentication procedure may comprise authenticating a first authentication factor and a second authentication factor. The first authentication factor may be based on verifying a login credential (such as a username and password) of a user of the endpoint device, and the second authentication factor may be based on performing a real-time verification of the user of the endpoint device. Examples of real-time verification options and examples of steps/messages for performing multi-factor authentication and delivering the token to endpoint device 110 are further described above with respect to FIGS. 1-3.

In certain embodiments, providing endpoint device 110 with the token is based on endpoint device 110 successfully completing the first multi-factor authentication procedure in connection with accessing any authentication enforcement resource 122 of a plurality of authentication enforcement resources 122 available to the user, regardless of whether the accessed authentication enforcement resource 122 is related to the protected resource 154 that endpoint device 110 later seeks to discover. Thus, the token may be provided implicitly and the user need not be aware of the token.

In certain embodiments, providing the token in step 502 may be performed by service provider 130, for example, based on service provider 130 receiving an indication that authentication server 120 successfully authenticated endpoint device 110.

At step 504, method 500 determines that endpoint device 110 has requested to discover a location of the protected resource 154. As described with respect to FIG. 1, the protected resource 154 is protected by a gateway 152. As an example, in certain embodiments, step 504 may be performed by gateway 152, and gateway 152 may determine that endpoint 110 has requested to discover a location of the protected resource 154 based on a message received from endpoint device 110 (such as message B in FIG. 3). As another example, in certain embodiments, step 504 may be performed by service provider 130, and service provider 130 may determine that endpoint 110 has requested to discover a location of the protected resource based on an indication that service provider 130 receives from gateway 152 (such as message C in FIG. 3).

At step 506, method 500 determines whether endpoint device 110 has provided a token (e.g., the token that was previously provided to endpoint 110 in step 502) and, if so, whether the token is valid. The token indicates that endpoint device 110 successfully completed the first multi-factor authentication procedure in connection with accessing authentication enforcement resource 122. Examples of steps/messages for obtaining the token from endpoint device 110 and validating the token are described above with respect to FIGS. 1-3. In certain embodiments, step 506 may be performed by service provider 130. In other embodiments, step 506 may be performed by gateway 152. If endpoint device 110 has provided a token that is valid, the method proceeds to step 508. If endpoint device 110 has not provided a token that is valid, the method proceeds to step 516.

At step 508, method 500 permits endpoint device 110 to discover the location of the protected resource 154 based on determining that endpoint device 110 has provided the token that is valid. The token may be considered valid if it has not expired or otherwise become invalid. In certain embodiments, permitting endpoint device 110 to discover the location of the protected resource 154 comprises communicating a resource-relay mapping to the endpoint device 110. Examples of steps/messages for discovering the location of protected resource 154 are described above with respect to FIGS. 1-3. In certain embodiments, step 508 may be performed by service provider 130. As an example, based on determining that endpoint device 110 has provided the token that is valid, service provider 130 may send gateway 152 an indication indicating that gateway 152 is permitted to send the location of the protected resource 154 to endpoint device 110. In certain embodiments, step 508 may be performed by gateway 152 (e.g., based on gateway 152 verifying the token(s) itself, or based on gateway 152 receiving confirmation from service provider 130 indicating that service provider 130 has verified the token(s)).

In certain embodiments, endpoint device 110 is permitted to discover the location of the protected resource 154 without requiring endpoint device 110 to establish a secure tunnel with gateway 152. For example, at a given time, endpoint device 110 may be in one of the following states: untrusted (e.g., if endpoint device 110 does not possess a token that is valid), minimally trusted (e.g., if endpoint device 110 possesses a token that is valid, but endpoint device 110 has not yet been fully authenticated by gateway 152), or trusted (e.g., if endpoint device has been fully authenticated by gateway 152). Certain embodiments allow endpoint device 110 to discover the location of protected resource 154 based on endpoint device 110 being minimally trusted. Certain embodiments may also allow endpoint device 110 to discover the location of protected resource 154 based on endpoint device 110 being trusted, however, full trust need not be required for endpoint device 110 to discover the location of protected resource 154 (as long as endpoint device 110 is at least minimally trusted).

After permitting endpoint device 110 to discover the location of the protected resource 154, method 500 may proceed to step 510 with determining that endpoint device 110 has requested to access the protected resource 154. As an example, in certain embodiments, gateway 152 may receive a request from endpoint device 110 that requests access to protected resource 154. At step 512, method 500 determines whether endpoint device 110 successfully completed a second multi-factor authentication procedure in connection with accessing the protected resource 154.

The second multi-factor authentication procedure involves gateway 152. The second multi-factor authentication procedure may use one or more authentication factors that are the same as those used during the first multi-factor authentication procedure, or the second multi-factor authentication procedure may use one or more authentication factors that are different from those used during the first multi-factor authentication procedure. In certain embodiments, the second multi-factor authentication procedure may comprise authenticating a first authentication factor and a second authentication factor. The first authentication factor may be based on verifying a login credential (such as a username and password) of the user of endpoint device 110. The login credential used to authenticate access to the protected resource 154 during the second multi-factor authentication procedure may be the same as the login credential used to authenticate access to the authentication enforcement resource 122 during the first multi-factor authentication procedure, or the second multi-factor authentication procedure may authenticate a different login credential. The second authentication factor may be based on performing a real-time verification of the user of endpoint device 110. In certain embodiments, gateway 152 may rely on service provider 130 to authenticate the second authentication factor. In certain embodiments, gateway 152 or service provider 130 may determine that the user of endpoint device 110 recently completed a successful real-time verification and may authenticate the second authentication factor on that basis (without having to prompt the user for another real-time verification).

If endpoint device 110 fails the second multi-factor authentication, the method skips to step 516. Alternatively, if endpoint device 110 has successfully completed the second multi-factor authentication, the method proceeds to step 514. At step 514, method 500 permits endpoint device 110 to access the protected resource 154 based on determining that endpoint device 110 successfully completed the second multi-factor authentication procedure. Certain embodiments facilitate access to the protected resource 154 via gateway 152. Examples of steps/messages for permitting access to protected resource 154 are described above with respect to FIGS. 1-3.

As described above, if it is determined at step 506 that endpoint device 110 has not provided a token that is valid, or if it is determined at step 512 that endpoint device 110 has not successfully completed the second multi-factor authentication, method 500 may include step 516. Step 516 facilitates a backup procedure. As an example, in certain embodiments, the backup procedure causes endpoint device 110 to perform a manual authentication procedure (such as a multi-factor authentication procedure involving service provider 130 and/or gateway 152). In certain embodiments, service provider 130 may initiate the backup procedure of step 516. In certain embodiments, gateway 152 may initiate the backup procedure of step 516.

In certain embodiments, the backup procedure of step 516 may be different and/or the backup procedure of step 516 may enforce different policies depending on whether the user of endpoint device 110 arrives at step 516 from step 506 or from step 512. For example, service provider 130 may comprise a configuration indicating the backup procedure to be used, the policy to enforce, or both, and the configuration may depend on whether the user of endpoint device 110 arrives at step 516 from step 506 or from step 512.

If an endpoint device 110 that arrives at step 516 from step 506 successfully completes the manual authentication procedure, the endpoint device 110 may be permitted to discover a location of protected resource 154. When arriving from step 506, the back procedure grants the minimal level of trust to enforce a minimal set of policies to facilitate discovery of the location of the protected resource 154.

If an endpoint device 110 that arrives at step 516 from step 512 successfully completes the manual authentication procedure, the endpoint device 110 may be permitted to access protected resource 154. Thus, when arriving from step 512, certain embodiments of the backup procedure of step 516 enforce any policies associated with accessing protected resource 154.

If endpoint device 110 fails the manual authentication procedure, endpoint device 110 may be prevented from discovering the location of protected resource 154 (e.g., in the case where the method enters step 516 from step 506) and may be prevented from accessing protected resource 154 (e.g., in the case where the method enters step 516 from step 506 or step 512).

In certain embodiments, method 500 may further comprise determining that endpoint device 110 has requested to discover a location of a second protected resource 154 (such as another protected resource 154 protected by gateway 152). Method 500 may determine that the token provided by endpoint device 110 has become invalid. For example, if the token provided to endpoint device 110 in step 502 is configured to expire, and if endpoint device 110 requests to discover the location of the second protected resource 154 after expiration of the token, method 500 may determine that the token has become invalid. In response, method 500 may facilitate a token refresh with endpoint device 110. For example, method 500 may initiate a backup (manual) authentication process to refresh the token. In certain embodiments, the token refresh comprises generating a new/refreshed token at service provider 130. Method 500 may then permit endpoint device 110 to discover the location of the second protected resource 154 after the token refresh.

Although certain examples have described certain functionality of service provider 130 and certain functionality of gateway 152, the functionality described may be allocated between service provider 130 and gateway 152 in any suitable manner.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components (such as a manager, controller, services engine, access point, wireless device, etc.) described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A system, the system comprising:
   one or more processors; and
   one or more computer-readable non-transitory storage media comprising instructions that, when executed by the one or more processors, cause one or more components of the system to perform operations comprising:
      determining that an endpoint device has requested to discover a location of a protected resource, the protected resource protected by a gateway;
      providing the endpoint device with a token based on the endpoint device successfully completing a first multi-factor authentication procedure, wherein the first multi-factor authentication procedure comprises authenticating a first authentication factor and a second authentication factor, the second authentication factor based on performing a real-time verification of a user of the endpoint device;
      receiving the token from the endpoint device;
      determining whether the token provided by the endpoint device is valid, the token indicating that the endpoint device successfully completed the first multi-factor authentication procedure in connection with accessing an authentication enforcement resource; and
      permitting the endpoint device to discover the location of the protected resource based on determining that the endpoint device has provided the token that is valid.

2. The system of claim 1, wherein the operations further comprise:
   after permitting the endpoint device to discover the location of the protected resource, determining that the endpoint device has requested to access the protected resource;
   determining whether the endpoint device successfully completed a second multi-factor authentication procedure in connection with accessing the protected resource, the second multi-factor authentication procedure involving the gateway; and permitting the endpoint device to access the protected resource based on determining that the endpoint device successfully completed the second multi-factor authentication procedure.

3. The system of claim 1, wherein the first authentication factor is based on verifying a login credential of the user of the endpoint device.

4. The system of claim 1, wherein the operations further comprise:
providing the endpoint device with the token based on the endpoint device successfully completing the first multi-factor authentication procedure in connection with accessing any authentication enforcement resource of a plurality of authentication enforcement resources available to the user of the endpoint device, regardless of whether the accessed authentication enforcement resource is related to the protected resource.

5. The system of claim 1, wherein the operations further comprise:
determining that the endpoint device has requested to discover a location of a second protected resource, the second protected resource protected by the gateway;
determining that the token provided by the endpoint device has become invalid;
facilitating a token refresh with the endpoint device; and
permitting the endpoint device to discover the location of the second protected resource after the token refresh.

6. The system of claim 1, wherein permitting the endpoint device to discover the location of the protected resource comprises communicating a resource-relay mapping to the endpoint device.

7. The system of claim 1, wherein the system provides a Zero Trust access model that requires the endpoint device to establish a minimum level of trust in order for the endpoint device to discover the location of the protected resource.

8. The system of claim 1, wherein the endpoint device is permitted to discover the location of the protected resource without requiring the endpoint device to establish a secure tunnel with the gateway.

9. The system of claim 1, wherein the first multi-factor authentication procedure is performed independently of the gateway.

10. A method, the method comprising:
determining that an endpoint device has requested to discover a location of a protected resource, the protected resource protected by a gateway;
providing the endpoint device with a token based on the endpoint device successfully completing a first multi-factor authentication procedure, wherein the first multi-factor authentication procedure comprises authenticating a first authentication factor and a second authentication factor, the second authentication factor based on performing a real-time verification of a user of the endpoint device;
receiving the token from the endpoint device;
determining whether the token provided by the endpoint device is valid, the token indicating that the endpoint device successfully completed the first multi-factor authentication procedure in connection with accessing an authentication enforcement resource; and
permitting the endpoint device to discover the location of the protected resource based on determining that the endpoint device has provided the token that is valid.

11. The method of claim 10, further comprising:
after permitting the endpoint device to discover the location of the protected resource, determining that the endpoint device has requested to access the protected resource;
determining whether the endpoint device successfully completed a second multi-factor authentication procedure in connection with accessing the protected resource, the second multi-factor authentication procedure involving the gateway; and
permitting the endpoint device to access the protected resource based on determining that the endpoint device successfully completed the second multi-factor authentication procedure.

12. The method of claim 10, wherein the first authentication factor based on verifying a login credential of the user of the endpoint device.

13. The method of claim 10, further comprising:
providing the endpoint device with the token based on the endpoint device successfully completing the first multi-factor authentication procedure in connection with accessing any authentication enforcement resource of a plurality of authentication enforcement resources available to the user of the endpoint device, regardless of whether the accessed authentication enforcement resource is related to the protected resource.

14. The method of claim 10, further comprising:
determining that an endpoint device has requested to discover a location of a second protected resource, the second protected resource protected by the gateway;
determining that the token provided by the endpoint device has become invalid;
facilitating a token refresh with the endpoint device; and
permitting the endpoint device to discover the location of the second protected resource after the token refresh.

15. One or more computer-readable non-transitory storage media embodying instructions that, when executed by a processor, cause performance of operations comprising:
determining that an endpoint device has requested to discover a location of a protected resource, the protected resource protected by a gateway;
providing the endpoint device with a token based on the endpoint device successfully completing a first multi-factor authentication procedure, wherein the first multi-factor authentication procedure comprises authenticating a first authentication factor and a second authentication factor, the second authentication factor based on performing a real-time verification of a user of the endpoint device;
receiving the token from the endpoint device;
determining whether the token provided by the endpoint device is valid, the token indicating that the endpoint device successfully completed the first multi-factor authentication procedure in connection with accessing an authentication enforcement resource; and
permitting the endpoint device to discover the location of the protected resource based on determining that the endpoint device has provided the token that is valid.

16. The one or more computer-readable non-transitory storage media of claim 15, wherein the operations further comprise:
after permitting the endpoint device to discover the location of the protected resource, determining that the endpoint device has requested to access the protected resource;
determining whether the endpoint device successfully completed a second multi-factor authentication procedure in connection with accessing the protected resource, the second multi-factor authentication procedure involving the gateway; and permitting the endpoint device to access the protected resource based on determining that the endpoint device successfully completed the second multi-factor authentication procedure.

17. The one or more computer-readable non-transitory storage media of claim 15, wherein the first authentication factor based on verifying a login credential of the user of the endpoint device.

18. The one or more computer-readable non-transitory storage media of claim 15, wherein the operations further comprise:

providing the endpoint device with the token based on the endpoint device successfully completing the first multi-factor authentication procedure in connection with accessing any authentication enforcement resource of a plurality of authentication enforcement resources available to the user of the endpoint device, regardless of whether the accessed authentication enforcement resource is related to the protected resource.

19. The one or more computer-readable non-transitory storage media of claim 15, wherein the operations further comprise:

determining that the endpoint device has requested to discover a location of a second protected resource, the second protected resource protected by the gateway;

determining that the token provided by the endpoint device has become invalid;

facilitating a token refresh with the endpoint device; and permitting the endpoint device to discover the location of the second protected resource after the token refresh.

20. The one or more computer-readable non-transitory storage media of claim 15, wherein permitting the endpoint device to discover the location of the protected resource comprises communicating a resource-relay mapping to the endpoint device.

* * * * *